United States Patent
Tian (10) Patent No.: US 12,122,263 B2
(45) Date of Patent: Oct. 22, 2024

(54) ELECTRIC OFF-ROAD VEHICLE CHARGING CONTROL METHOD, COMPUTER DEVICE AND STORAGE MEDIUM

(71) Applicant: RoyPow Technology Co., Ltd., Guangdong (CN)

(72) Inventor: Yuanbo Tian, Huizhou (CN)

(73) Assignee: RoyPow Technology Co., Ltd., Huizhou (CN)

(*) Notice: Subject to any disclaimer, the term of this patent is extended or adjusted under 35 U.S.C. 154(b) by 554 days.

(21) Appl. No.: 17/559,235

(22) Filed: Dec. 22, 2021

(65) Prior Publication Data

US 2023/0083817 A1 Mar. 16, 2023

(30) Foreign Application Priority Data

Sep. 13, 2021 (CN) .......................... 202111071100.X (51) Int. Cl.
| | |
|---|---|
| *B60L 58/15* | (2019.01) |
| *B60L 53/24* | (2019.01) |
| *B60W 10/08* | (2006.01) |
| *B60W 30/18* | (2012.01) |
| *H02J 7/00* | (2006.01) |

(52) U.S. Cl.
CPC ............ *B60L 58/15* (2019.02); *B60W 10/08* (2013.01); *B60W 30/18127* (2013.01); *H02J 7/0049* (2020.01); *B60L 53/24* (2019.02)

(58) Field of Classification Search
None
See application file for complete search history.

(56) References Cited

U.S. PATENT DOCUMENTS

2017/0120762 A1* 5/2017 Zettel ..................... B60L 7/14
2021/0001834 A1* 1/2021 Kim ..................... B60W 20/14

* cited by examiner

*Primary Examiner* — Todd Melton
*Assistant Examiner* — Jason R Roberson (57) ABSTRACT

The present application relates to an electric off-road vehicle charging control method, a computer device and a storage medium. The method includes: acquiring first power-condition data and second power-condition data; the first power-condition data is a cumulative number of times a feedback ratio of a vehicle-mounted energy storage system is greater than a feedback ratio threshold; the second power-condition data is a cumulative number of times the feedback ratio is less than the feedback ratio threshold; comparing a target difference with a second preset threshold, and determining a charging mode according to the comparison result; the charging mode includes a normal charging mode and a reserving margin capacity charging mode; and controlling, if the charging mode is the reserving margin capacity charging mode, the vehicle-mounted energy storage system to stop charging in a case where the state-of-charge of the vehicle-mounted energy storage system reaches a full charge control state-of-charge.

15 Claims, 4 Drawing Sheets

ELECTRIC OFF-ROAD VEHICLE CHARGING CONTROL METHOD, COMPUTER DEVICE AND STORAGE MEDIUM

CROSS-REFERENCE TO RELATED APPLICATIONS

The present application claims priority to Chinese patent application No. 202111071100X, entitled ELECTRIC OFF-ROAD VEHICLE CHARGING CONTROL METHOD AND APPARATUS, COMPUTER DEVICE AND STORAGE MEDIUM, filed on Sep. 13, 2021, the specification of which is incorporated herein by reference in its entirety.

TECHNICAL FIELD

The present application relates to the field of charging control technologies, and in particular, to an electric off-road vehicle charging control method, a computer device and a storage medium.

BACKGROUND

Under the background of environmental protection and increasingly tight energy supply, electric off-road vehicles in the field of new energy are developing rapidly. Regenerative braking energy generated by a motor may be absorbed by a regenerative braking energy feedback apparatus during braking of the electric off-road vehicles. However, vehicle-mounted energy storage systems of electric off-road vehicles have a limited electric capacity, and the vehicle-mounted energy storage systems in a fully charged state are often required to absorb large-capacity regenerative braking energy after passing through a long downhill section. As a result, this easily leads to over-charging of the vehicle-mounted energy storage systems, and may even cause large safety problems.

SUMMARY

In view of the above, there is a need to provide, with respect to the above technical problems, an electric off-road vehicle charging control method and apparatus, a computer device and a storage medium.

In a first aspect, an electric off-road vehicle charging control method is provided, and the method includes:

acquiring first power-condition data and second power-condition data; the first power-condition data is a cumulative number of times that a feedback ratio of a vehicle-mounted energy storage system is greater than a feedback ratio threshold; the second power-condition data is a cumulative number of times that the feedback ratio is less than the feedback ratio threshold; the feedback ratio is a ratio of a target feedback capacity to a rated capacity of the vehicle-mounted energy storage system; and the target feedback capacity is a capacity of regenerative braking energy received during a period when a state-of-charge of the vehicle-mounted energy storage system decreases from a fully charged state to a first preset threshold;

comparing a target difference with a second preset threshold, and determining a charging mode of the vehicle-mounted energy storage system according to the comparison result; the charging mode including a normal charging mode and a reserving margin capacity charging mode; and the target difference is a difference between the first power-condition data and the second power-condition data; and controlling, if the charging mode is the reserving margin capacity charging mode, the vehicle-mounted energy storage system to stop charging in a case where the state-of-charge of the vehicle-mounted energy storage system reaches a full charge control state-of-charge.

In one embodiment, the step of acquiring first power-condition data and second power-condition data includes: acquiring pre-stored first historical power-condition data and second historical power-condition data; performing calculation according to the target feedback capacity to obtain the feedback ratio if the state-of-charge of the vehicle-mounted energy storage system decreases from the fully charged state to the first preset threshold; determining whether the feedback ratio is greater than or equal to the feedback ratio threshold; if yes, updating the first historical power-condition data to obtain the first power-condition data, and taking the second historical power-condition data as the second power-condition data; and if no, updating the second historical power-condition data to obtain the second power-condition data, and taking the first historical power-condition data as the first power-condition data.

In one embodiment, the step of comparing a target difference with a second preset threshold, and determining a charging mode of the vehicle-mounted energy storage system according to the comparison result includes: determining whether the target difference is greater than the second preset threshold; if yes, determining the charging mode of the vehicle-mounted energy storage system as the reserving margin capacity charging mode; and if no, determining the charging mode of the vehicle-mounted energy storage system as the normal charging mode.

In one embodiment, the step of controlling the vehicle-mounted energy storage system to stop charging in a case where the state-of-charge of the vehicle-mounted energy storage system reaches a full charge control state-of-charge includes: querying a lookup table according to the full charge control state-of-charge to obtain a full charge control voltage; and controlling the vehicle-mounted energy storage system to stop charging if a charging voltage of the vehicle-mounted energy storage system is equal to the full charge control voltage.

In one embodiment, prior to the step of controlling the vehicle-mounted energy storage system to stop charging in a case where the state-of-charge of the vehicle-mounted energy storage system reaches a full charge control state-of-charge, the method further includes: calculating the full charge control state-of-charge according to the feedback ratio.

In one embodiment, the step of calculating the full charge control state-of-charge according to the feedback ratio includes: acquiring a preset number of historical feedback ratios; calculating an average value of the feedback ratio according to the feedback ratio and the historical feedback ratios; and calculating the full charge control state-of-charge according to the average value.

In one embodiment, the method further includes: controlling, if the charging mode is the normal charging mode, the vehicle-mounted energy storage system to stop charging in a case where the state-of-charge of the vehicle-mounted energy storage system reaches the fully charged state.

In a second aspect, an electric off-road vehicle charging control apparatus is provided. The apparatus includes a first acquisition module, a mode determination module and a charging control module.

The first acquisition module is configured to acquire first power-condition data and second power-condition data. The first power-condition data is a cumulative number of times that a feedback ratio of a vehicle-mounted energy storage system is greater than a feedback ratio threshold. The second power-condition data is a cumulative number of times that the feedback ratio is less than the feedback ratio threshold. The feedback ratio is a ratio of a target feedback capacity to a rated capacity of the vehicle-mounted energy storage system. The target feedback capacity is a capacity of regenerative braking energy received during a period when a state-of-charge of the vehicle-mounted energy storage system decreases from a fully charged state to a first preset threshold. The mode determination module is configured to compare a target difference with a second preset threshold, and determine a charging mode of the vehicle-mounted energy storage system according to the comparison result. The charging mode includes a normal charging mode and a reserving margin capacity charging mode. The target difference is a difference between the first power-condition data and the second power-condition data. The charging control module is configured to control, if the charging mode is the reserving margin capacity charging mode, the vehicle-mounted energy storage system to stop charging in a case where the state-of-charge of the vehicle-mounted energy storage system reaches a full charge control state-of-charge.

In a third aspect, a computer device is provided. The computer device includes a memory and a processor. The memory stores a computer program. When the computer program is executed by the processor, steps of the method according to any one of the above method embodiments are performed.

In a fourth aspect, a computer-readable storage medium is provided. The computer-readable storage medium stores a computer program thereon. When the computer program is executed by a processor, steps of the method according to any one of the above method embodiments are performed.

According to the electric off-road vehicle charging control method and apparatus, the computer device and the storage medium, the cumulative number of times that the feedback ratio of a vehicle-mounted energy storage system is greater than a feedback ratio threshold, i.e., the first power-condition data, and the cumulative number of times that the feedback ratio is less than the feedback ratio threshold, i.e., the second power-condition data, are acquired. Then, the target difference is compared with the second preset threshold, and the charging mode of the vehicle-mounted energy storage system is determined according to the comparison result. Next, if the charging mode is the reserving margin capacity charging mode, the vehicle-mounted energy storage system is controlled to stop charging in a case where the state-of-charge of the vehicle-mounted energy storage system reaches the full charge control state-of-charge. Thus, the vehicle-mounted energy storage system automatically reserves a margin capacity when it is often necessary to pass through a long downhill section after a fully charged state, so that the vehicle-mounted energy storage system has a sufficient capacity to absorb regenerative braking energy generated by electric off-road vehicles during downhill braking, which prevents over-charging of the vehicle-mounted energy storage system, reduces use risks of electric off-road vehicles, and improves energy saving performance of the electric off-road vehicles.

DETAILED DESCRIPTION

In order to make the objectives, technical solutions and advantages of the present application clearer, the present application is described in further detail below with reference to the accompanying drawings and embodiments. It is to be understood that specific embodiments described herein are intended only to illustrate the present application, but are not to limit the present application.

Figure 1:
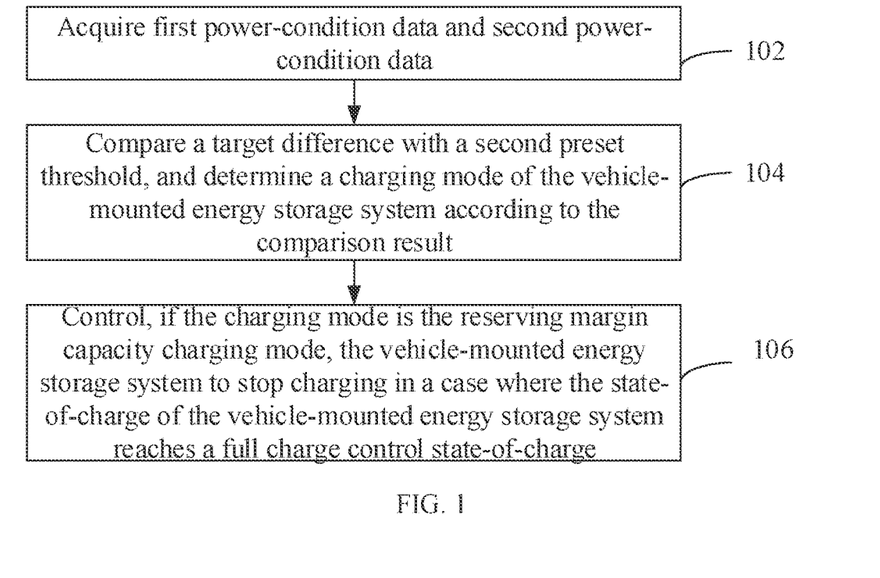
FIG. 1 is a first schematic flowchart of an electric off-road vehicle charging control method according to an embodiment.

In one embodiment, as shown in FIG. 1, an electric off-road vehicle charging control method is provided. This embodiment is described with an example in which the method is applied to a battery management system (BMS) of an electric off-road vehicle. In this embodiment, the method includes step 102 to step 106.

In step 102, first power-condition data and second power-condition data are acquired.

The first power-condition data is a cumulative number of times that a feedback ratio of a vehicle-mounted energy storage system is greater than a feedback ratio threshold. The second power-condition data is a cumulative number of times that the feedback ratio is less than the feedback ratio threshold. The feedback ratio is a ratio of a target feedback capacity to a rated capacity of the vehicle-mounted energy storage system. The target feedback capacity is a capacity of regenerative braking energy received during a period when a state-of-charge of the vehicle-mounted energy storage system decreases from a fully charged state to a first preset threshold. The fully charged state refers to a specific state-of-charge in which the vehicle-mounted energy storage system is fully charged. In a specific example, the fully charged state may be a state in which the state-of-charge of the vehicle-mounted energy storage system is 100%, and the fully charged state may also gradually decrease with the aging of the vehicle-mounted energy storage system, which may be flexibly set as required during actual application and is not limited herein. The BMS may directly acquire the first power-condition data and the second power-condition data by a self-learning algorithm when the vehicle-mounted energy storage system is used for the first time.

Figure 2:
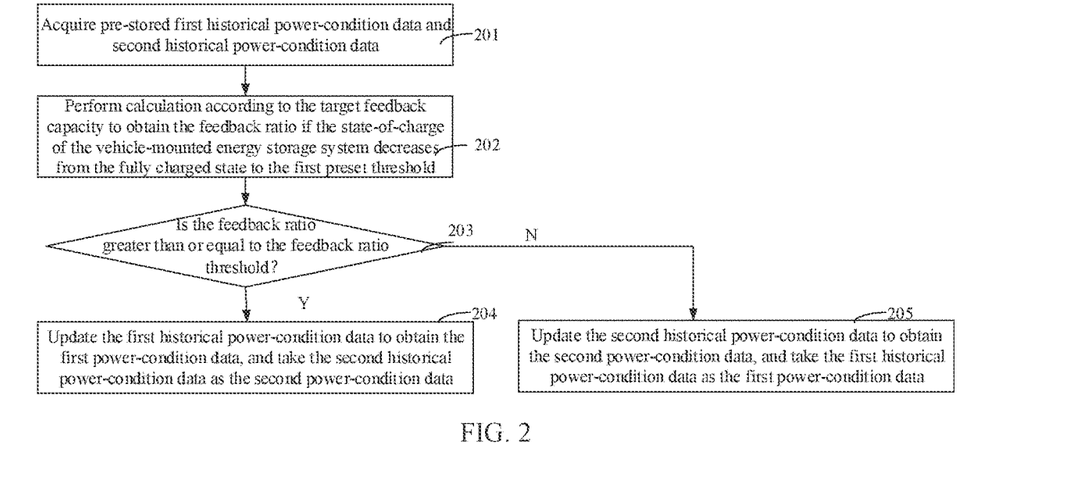
FIG. 2 is a schematic flowchart of a step of acquiring first power-condition data and second power-condition data according to an embodiment.

In one example, as shown in FIG. 2, the step of acquiring first power-condition data and second power-condition data includes step 201 to step 205.

In step 201, pre-stored first historical power-condition data and second historical power-condition data are acquired.

The first historical power-condition data is a cumulative number of times that the feedback ratio of the vehicle-mounted energy storage system is greater than the feedback ratio threshold in latest power-condition data statistics. The second historical power-condition data is a cumulative number of times that the feedback ratio is less than the feedback ratio threshold in the latest power-condition data statistics. The BMS may acquire pre-stored first historical power-condition data and second historical power-condition data.

In step 202, calculation is performed according to the target feedback capacity to obtain the feedback ratio if the state-of-charge of the vehicle-mounted energy storage system decreases from the fully charged state to the first preset threshold.

The BMS may perform calculation according to the target feedback capacity to obtain the feedback ratio if the state-of-charge of the vehicle-mounted energy storage system decreases from the fully charged state to the first preset threshold. In a specific example, the first preset threshold may be, but is not limited to, 90% or 95%, which may be flexibly set as required during actual application and is not limited herein.

In step 203, it is determined whether the feedback ratio is greater than or equal to the feedback ratio threshold.

In step 204, if yes, the first historical power-condition data is updated to obtain the first power-condition data, and the second historical power-condition data is taken as the second power-condition data.

In step 205, if no, the second historical power-condition data is updated to obtain the second power-condition data, and the first historical power-condition data is taken as the first power-condition data.

The BMS, after obtaining the feedback ratio by calculation, determines whether the feedback ratio is greater than or equal to the feedback ratio threshold; and when the feedback ratio is greater than or equal to the feedback ratio threshold, automatically increases the first historical power-condition data by one for updating, so as to obtain the first power-condition data, and the second historical power-condition data is taken as the second power-condition data. When the feedback ratio is less than the feedback ratio threshold, the second historical power-condition data is automatically increased by one for updating, so as to obtain the second power-condition data, and the first historical power-condition data is taken as the first power-condition data.

In a specific example, the feedback ratio threshold may be, but is not limited to, 2%, which may be flexibly set as required during actual application and is not limited herein.

In this embodiment, the first historical power-condition data and second historical power-condition data which are pre-stored are acquired. Then, calculation is performed according to the target feedback capacity to obtain the feedback ratio if the state-of-charge of the vehicle-mounted energy storage system decreases from the fully charged state to the first preset threshold. Next, it is determined whether the feedback ratio is greater than or equal to the feedback ratio threshold. Then, when the feedback ratio is greater than or equal to the feedback ratio threshold, the first historical power-condition data is updated to obtain the first power-condition data, and the second historical power-condition data is taken as the second power-condition data. When the feedback ratio is less than the feedback ratio threshold, the second historical power-condition data is updated to obtain the second power-condition data, and the first historical power-condition data is taken as the first power-condition data. Therefore, a using power-condition of an electric off-road vehicle may be accurately identified through the first power-condition data and the second power-condition data obtained in the above process, so as to accurately control a charging process of the electric off-road vehicle.

In step 104, a target difference is compared with a second preset threshold, and a charging mode of the vehicle-mounted energy storage system is determined according to the comparison result.

The charging mode includes a normal charging mode and a reserving margin capacity charging mode. The target difference is a difference between the first power-condition data and the second power-condition data. The BMS may perform calculation according to a difference between the first power-condition data and the second power-condition data to obtain a target difference, compare the target difference with a second preset threshold, and determine a charging mode of the vehicle-mounted energy storage system according to the comparison result.

In a specific example, the second preset threshold may be, but is not limited to, 3, which may be flexibly set as required during actual application and is not limited herein.

In one embodiment, the step of comparing a target difference with a second preset threshold, and determining a charging mode of the vehicle-mounted energy storage system according to the comparison result includes: determining whether the target difference is greater than the second preset threshold; if yes, the charging mode of the vehicle-mounted energy storage system is the reserving margin capacity charging mode; and if no, the charging mode of the vehicle-mounted energy storage system is the normal charging mode.

Figure 3:
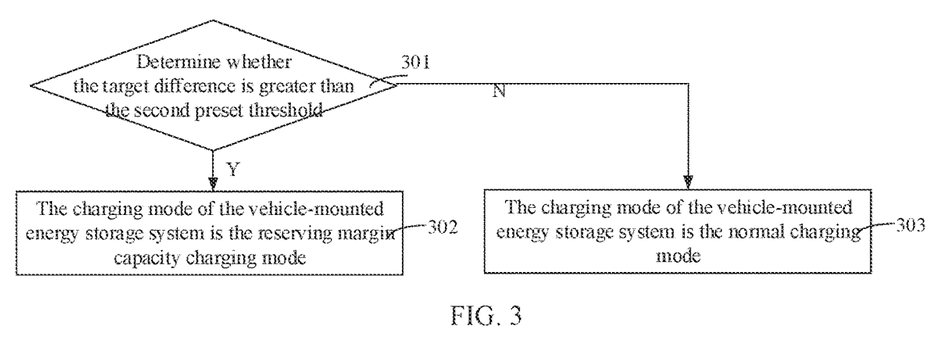
FIG. 3 is a schematic flowchart of a step of determining a charging mode of a vehicle-mounted energy storage system according to an embodiment.

In one embodiment, as shown in FIG. 3, the step of comparing a target difference with a second preset threshold, and determining a charging mode of the vehicle-mounted energy storage system according to the comparison result includes the following steps.

In step 301, it is determined whether the target difference is greater than the second preset threshold.

In step 302, if yes, the charging mode of the vehicle-mounted energy storage system is the reserving margin capacity charging mode.

In step 303, if no, the charging mode of the vehicle-mounted energy storage system is the normal charging mode.

The BMS may perform calculation according to a difference between the first power-condition data and the second power-condition data to obtain a target difference, and determine whether the target difference is greater than the second preset threshold. When the target difference is greater than the second preset threshold, it indicates that the first power-condition data is significantly greater than the second power-condition data. That is, it is more common that the feedback ratio of the vehicle-mounted energy storage system is greater than the feedback ratio threshold. There is a need to reserve a certain capacity for the vehicle-mounted energy storage system to absorb regenerative braking energy during the charging. Therefore, the charging mode of the vehicle-mounted energy storage system in this case is the reserving margin capacity charging mode. When the target difference is less than or equal to the second preset threshold, it indicates that the first power-condition data is not significantly greater than the second power-condition data. That is, it is not common that the feedback ratio of the vehicle-mounted energy storage system is greater than the feedback ratio threshold. There is no need to reserve a certain capacity for the vehicle-mounted energy storage system to absorb regenerative braking energy during the charging. Therefore, the charging mode of the vehicle-mounted energy storage system in this case is the normal charging mode.

In this embodiment, the charging mode of the vehicle-mounted energy storage system may be accurately determined according to the comparison between the target difference and the second preset threshold, so as to improve accuracy of electric off-road vehicle charging control.

In step 106, if the charging mode is the reserving margin capacity charging mode, the vehicle-mounted energy storage system is controlled to stop charging in a case where the state-of-charge of the vehicle-mounted energy storage system reaches a full charge control state-of-charge.

The full charge control state-of-charge refers to a maximum state-of-charge that can be reached by the vehicle-mounted energy storage system during the charging. The BMS controls, when the charging mode is the reserving margin capacity charging mode, the vehicle-mounted energy storage system to stop charging in a case where the state-of-charge of the vehicle-mounted energy storage system reaches a full charge control state-of-charge during the charging.

In one embodiment, prior to the step of controlling the vehicle-mounted energy storage system to stop charging in a case where the state-of-charge of the vehicle-mounted energy storage system reaches a full charge control state-of-charge, the method further includes:

calculating the full charge control state-of-charge according to the feedback ratio.

The feedback ratio is a ratio of a target feedback capacity to a rated capacity of the vehicle-mounted energy storage system.

In one embodiment, the full charge control state-of-charge is expressed as:

$$SOC_1 = 100\% - (\frac{C_1}{C_2}) \times 100\%$$

where $SOC_1$ denotes the full charge control state-of-charge; $C_1$ denotes the target feedback capacity; and $C_2$ denotes the rated capacity of the vehicle-mounted energy storage system.

Figure 4:
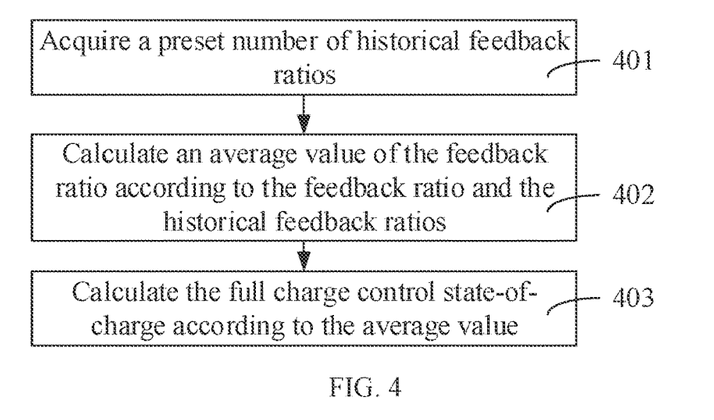
FIG. 4 is a schematic flowchart of a step of calculating a full charge control state-of-charge according to a feedback ratio according to an embodiment.

In one embodiment, as shown in FIG. 4, the step of calculating the full charge control state-of-charge according to the feedback ratio includes the following steps.

In step 401, a preset number of historical feedback ratios are acquired.

In step 402, an average value of the feedback ratio is calculated according to the feedback ratio and the historical feedback ratios.

In step 403, the full charge control state-of-charge is calculated according to the average value.

The BMS may acquire a preset number of historical feedback ratios, and perform calculation according to the feedback ratio obtained by calculation based on the target feedback capacity and the historical feedback ratios, so as to obtain an average value of the feedback ratio. Then, the full charge control state-of-charge is calculated according to the average value. In a specific example, the preset number may be, but is not limited to, 9, which may be flexibly set as required during actual application and is not limited herein.

In this embodiment, calculation is performed according to the preset number of historical feedback ratios acquired in combination with the feedback ratio, so as to obtain an average value of the feedback ratio. Then, the full charge control state-of-charge is accurately calculated according to the average value, so as to accurately control the charging of the electric off-road vehicle, thereby improving the accuracy of the electric off-road vehicle charging control.

Based on this, the cumulative number of times that the feedback ratio of the vehicle-mounted energy storage system is greater than the feedback ratio threshold, i.e., the first power-condition data, and the cumulative number of times that the feedback ratio is less than the feedback ratio threshold, i.e., second power-condition data, are acquired. Then, the target difference is compared with the second preset threshold, and the charging mode of the vehicle-mounted energy storage system is determined according to the comparison result. Next, if the charging mode is the reserving margin capacity charging mode, the vehicle-mounted energy storage system is controlled to stop charging in a case where the state-of-charge of the vehicle-mounted energy storage system reaches the full charge control state-of-charge. Thus, the vehicle-mounted energy storage system automatically reserves a margin capacity when it is often necessary to pass through a long downhill section after a fully charged state, so that the vehicle-mounted energy storage system has a sufficient capacity to absorb regenerative braking energy generated by electric off-road vehicles during downhill braking, which prevents over-charging of the vehicle-mounted energy storage system, reduces use risks of electric off-road vehicles, and improves energy saving performance of the electric off-road vehicles.

Figure 5:
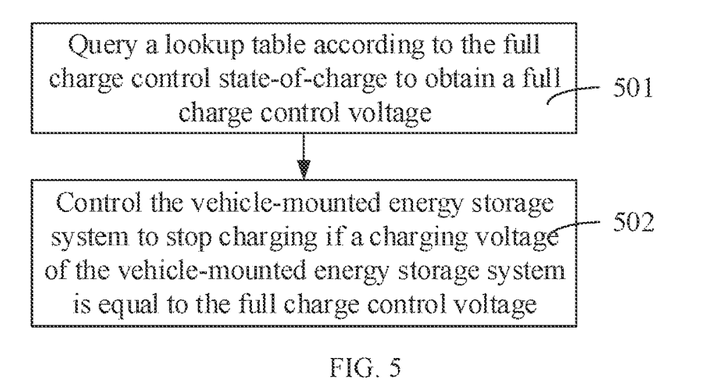
FIG. 5 is a schematic flowchart of a step of controlling the vehicle-mounted energy storage system to stop charging according to an embodiment.

In one embodiment, as shown in FIG. 5, the step of controlling the vehicle-mounted energy storage system to stop charging in a case where the state-of-charge of the vehicle-mounted energy storage system reaches a full charge control state-of-charge includes the following steps.

In step 501, a lookup table is queried according to the full charge control state-of-charge to obtain a full charge control voltage.

In step 502, the vehicle-mounted energy storage system is controlled to stop charging if a charging voltage of the vehicle-mounted energy storage system is equal to the full charge control voltage.

The BMS may query the lookup table according to the full charge control state-of-charge to obtain a full charge control voltage, and control the vehicle-mounted energy storage system to stop charging when detecting during the charging of the vehicle-mounted energy storage system that the charging voltage of the vehicle-mounted energy storage system is equal to the full charge control voltage.

In this embodiment, a corresponding full charge control voltage is obtained according to the full charge control state-of-charge, so as to control the charging of the vehicle-mounted energy storage system, prevent using the state-of-charge of the vehicle-mounted energy storage system with a large error to control the charging of the vehicle-mounted energy storage system directly according to the full charge control state-of-charge, thereby improving the accuracy of the electric off-road vehicle charging control.

Figure 6:
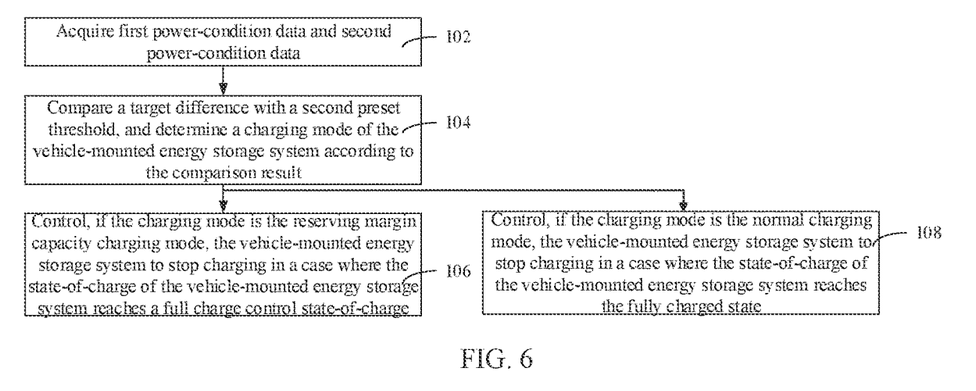
FIG. 6 is a second schematic flowchart of the electric off-road vehicle charging control method according to an embodiment.

In one embodiment, as shown in FIG. 6, the method further includes the following step.

In step 108, if the charging mode is the normal charging mode, the vehicle-mounted energy storage system is controlled to stop charging in a case where the state-of-charge of the vehicle-mounted energy storage system reaches the fully charged state.

The fully charged state refers to a specific state-of-charge in which the vehicle-mounted energy storage system is fully charged. In a specific example, the fully charged state may be a state in which the state-of-charge of the vehicle-mounted energy storage system is 100%, and the fully charged state may also gradually decrease with the aging of the vehicle-mounted energy storage system, which may be flexibly set as required during actual application and is not limited herein. The BMS controls, if the charging mode is the normal charging mode, the vehicle-mounted energy storage system to stop charging in a case where the state-of-charge of the vehicle-mounted energy storage system reaches the fully charged state.

It is to be understood that, although the steps in the flowcharts of FIG. 1 to FIG. 6 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 1 to FIG. 6 may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Figure 7:
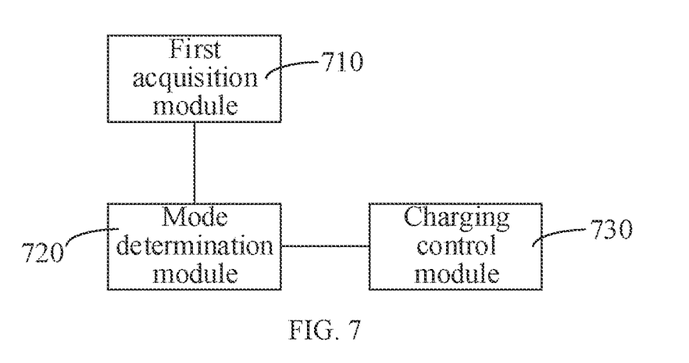
FIG. 7 is a structural block diagram of an electric off-road vehicle charging control apparatus according to an embodiment.

In one embodiment, as shown in FIG. 7, an electric off-road vehicle charging control apparatus is provided. The apparatus includes a first acquisition module 710, a mode determination module 720 and a charging control module 730.

The first acquisition module 710 is configured to acquire first power-condition data and second power-condition data. The first power-condition data is a cumulative number of times that a feedback ratio of a vehicle-mounted energy storage system is greater than a feedback ratio threshold. The second power-condition data is a cumulative number of times that the feedback ratio is less than the feedback ratio threshold. The feedback ratio is a ratio of a target feedback capacity to a rated capacity of the vehicle-mounted energy storage system. The target feedback capacity is a capacity of regenerative braking energy received during a period when a state-of-charge of the vehicle-mounted energy storage system decreases from a fully charged state to a first preset threshold. The mode determination module 720 is configured to compare a target difference with a second preset threshold, and determine a charging mode of the vehicle-mounted energy storage system according to the comparison result. The charging mode includes a normal charging mode and a reserving margin capacity charging mode. The target difference is a difference between the first power-condition data and the second power-condition data. The charging control module 730 is configured to control, if the charging mode is the reserving margin capacity charging mode, the vehicle-mounted energy storage system to stop charging in a case where the state-of-charge of the vehicle-mounted energy storage system reaches a full charge control state-of-charge.

In one embodiment, the first acquisition module 710 includes a first acquisition unit, a feedback ratio calculation unit and a first judgment unit.

The first acquisition unit is configured to acquire pre-stored first historical power-condition data and second historical power-condition data. The feedback ratio calculation unit is configured to perform calculation according to the target feedback capacity to obtain the feedback ratio if the state-of-charge of the vehicle-mounted energy storage system decreases from the fully charged state to the first preset threshold. The first judgment unit is configured to determine whether the feedback ratio is greater than or equal to the feedback ratio threshold. The first judgment unit is further configured to, when the feedback ratio is greater than or equal to the feedback ratio threshold, update the first historical power-condition data to obtain the first power-condition data, and take the second historical power-condition data as the second power-condition data. The first judgment unit is further configured to, when the feedback ratio is less than the feedback ratio threshold, update the second historical power-condition data to obtain the second power-condition data, and take the first historical power-condition data as the first power-condition data.

In one embodiment, the mode determination module 720 includes a second judgment unit.

The second judgment unit is configured to determine whether the target difference is greater than the second preset threshold. The second judgment unit is further configured to determine that the charging mode of the vehicle-mounted energy storage system is the reserving margin capacity charging mode if the target difference is greater than the second preset threshold. The second judgment unit is further configured to determine that the charging mode of the vehicle-mounted energy storage system is the normal charging mode if the target difference is less than or equal to the second preset threshold.

In one embodiment, the charging control module 730 includes a full charge control voltage acquisition unit and a charging control unit.

The full charge control voltage acquisition unit is configured to query a lookup table according to the full charge control state-of-charge to obtain a full charge control voltage. The charging control unit is configured to control the vehicle-mounted energy storage system to stop charging if a charging voltage of the vehicle-mounted energy storage system is equal to the full charge control voltage.

In one embodiment, the charging control module 730 further includes a full charge control state-of-charge calculation unit. The full charge control state-of-charge calculation unit is configured to calculate the full charge control state-of-charge according to the feedback ratio.

In one embodiment, the full charge control state-of-charge calculation unit includes a historical feedback ratio acquisition subunit, an average value calculation subunit and a full charge control state-of-charge calculation subunit.

The historical feedback ratio acquisition subunit is configured to acquire a preset number of historical feedback ratios. The average value calculation subunit is configured to calculate an average value of the feedback ratio according to the feedback ratio and the historical feedback ratios. The full charge control state-of-charge calculation subunit is configured to calculate the full charge control state-of-charge according to the average value.

In one embodiment, the charging control module 730 is further configured to control, if the charging mode is the normal charging mode, the vehicle-mounted energy storage system to stop charging in a case where the state-of-charge of the vehicle-mounted energy storage system reaches the fully charged state.

Specific limitations on the electric off-road vehicle charging control apparatus may be obtained with reference to the limitations on the electric off-road vehicle charging control method hereinabove, which are not described in detail herein. Each module in the electric off-road vehicle charging control apparatus may be entirely or partially implemented by using software, hardware, or a combination thereof. The above modules may be built in or independent of a processor of a computer device in a hardware form, or may be stored in a memory of the computer device in a software form, so that the processor invokes and performs an operation corresponding to each of the above modules.

In one embodiment, a computer device is provided. The computer device may be a BMS system. A diagram of an internal structure thereof may be shown in FIG. 8. The computer device includes a processor, a memory, a communication interface, a display screen, and an input apparatus that are connected through a system bus. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The communication interface of the computer device is configured to communicate with an external terminal in a wired or wireless manner. The wireless manner may be achieved through WIFI, a carrier network, NFC (Near field communication) or other technologies. When the computer program is executed by a processor, an electric off-road vehicle charging control method is implemented. The display screen of the computer device may be a liquid crystal display screen or an electronic ink display screen. The input apparatus of the computer device may be a touchscreen covering the display screen, or may be a key, a trackball, or a touchpad disposed on a housing of the computer device, or may be an external keyboard, a touchpad, a mouse, or the like.

Figure 8:
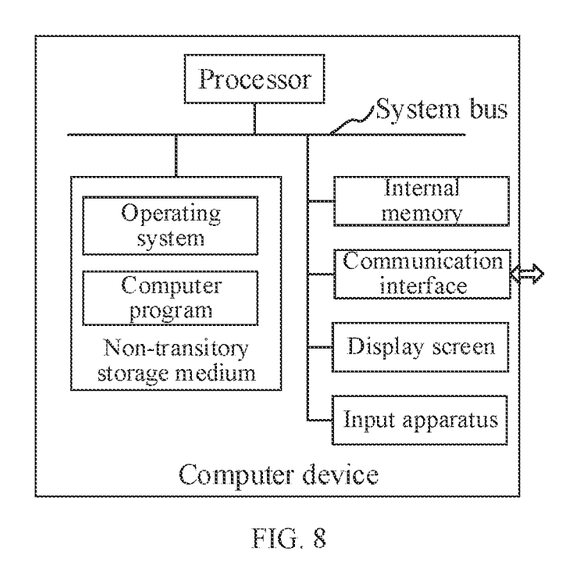
FIG. 8 is a diagram of an internal structure of a computer device according to an embodiment.

Those skilled in the art may understand that, in the structure shown in FIG. 8, only a block diagram of a partial structure related to a solution of the present application is shown, which does not constitute a limitation on the computer device to which the solution of the present application is applied. Specifically, the computer device may include more or fewer components than those shown in the figure, or some components may be combined, or a different component deployment may be used.

In one embodiment, a computer device is provided. The computer device includes a memory and a processor. The memory stores a computer program. The processor, when executing the computer program, performs steps of the method according to any one of the above method embodiments.

In one embodiment, a computer-readable storage medium is provided. The computer-readable storage medium stores a computer program thereon. When the computer program is executed by a processor, steps of the method according to any one of the above method embodiments are performed.

Those of ordinary skill in the art may understand that all or some procedures in the methods in the foregoing embodiments may be implemented by a computer program instructing related hardware, the computer program may be stored in a non-transitory computer-readable storage medium, and when the computer program is executed, the procedures in the foregoing method embodiments may be implemented. Any reference to a memory, a storage, a database, or other media used in the embodiments provided in the present application may include at least one of a non-transitory memory and a transitory memory. The non-transitory memory may include a read-only memory (ROM), a magnetic tape, a floppy disk, a flash memory, an optical memory or the like. The transitory memory may include a random access memory (RAM) or an external high-speed cache memory. By way of illustration and not limitation, the RAM is available in a variety of forms, such as a static RAM (SRAM), a dynamic RAM (DRAM), and the like.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and their description is specific and detailed, but cannot therefore be understood as a limitation on the patent scope of the present disclosure. It should be noted that those of ordinary skill in the art may further make variations and improvements without departing from the conception of the present application, and these all fall within the protection scope of the present application. Therefore, the patent protection scope of the present application should be subject to the appended claims.

What is claimed is:

1. An electric off-road vehicle charging control method, wherein the method comprises:
   acquiring first power-condition data and second power-condition data; wherein the first power-condition data is a cumulative number of times that a feedback ratio of a vehicle-mounted energy storage system is greater than a feedback ratio threshold; the second power-condition data is a cumulative number of times that the feedback ratio is less than the feedback ratio threshold; the feedback ratio is a ratio of a target feedback capacity to a rated capacity of the vehicle-mounted energy storage system; and the target feedback capacity is a capacity of regenerative braking energy received during a period when a state-of-charge of the vehicle-mounted energy storage system decreases from a fully charged state to a first preset threshold;
   comparing a target difference with a second preset threshold to obtain a comparison result, and determining a charging mode of the vehicle-mounted energy storage system according to the comparison result; wherein the charging mode comprises a normal charging mode and a reserving margin capacity charging mode; and the target difference is a difference between the first power-condition data and the second power-condition data; and
   controlling, if the charging mode is the reserving margin capacity charging mode, the vehicle-mounted energy storage system to stop charging in a case where the state-of-charge of the vehicle-mounted energy storage system reaches a full charge control state-of-charge.

2. The method according to claim 1, wherein the step of acquiring first power-condition data and second power-condition data comprises:
   acquiring pre-stored first historical power-condition data and second historical power-condition data;
   performing calculation according to the target feedback capacity to obtain the feedback ratio if the state-of-charge of the vehicle-mounted energy storage system decreases from the fully charged state to the first preset threshold;
   determining whether the feedback ratio is greater than or equal to the feedback ratio threshold;
   if yes, updating the first historical power-condition data to obtain the first power-condition data, and taking the second historical power-condition data as the second power-condition data; and if no, updating the second historical power-condition data to obtain the second power-condition data, and taking the first historical power-condition data as the first power-condition data.

3. The method according to claim 1, wherein the step of comparing a target difference with a second preset threshold, and determining a charging mode of the vehicle-mounted energy storage system according to the comparison result comprises:
determining whether the target difference is greater than the second preset threshold;
if yes, determining the charging mode of the vehicle-mounted energy storage system as the reserving margin capacity charging mode; and
if no, determining the charging mode of the vehicle-mounted energy storage system as the normal charging mode.

4. The method according to claim 1, wherein the step of controlling the vehicle-mounted energy storage system to stop charging in a case where the state-of-charge of the vehicle-mounted energy storage system reaches a full charge control state-of-charge comprises:
querying a lookup table according to the full charge control state-of-charge to obtain a full charge control voltage; and
controlling the vehicle-mounted energy storage system to stop charging if a charging voltage of the vehicle-mounted energy storage system is equal to the full charge control voltage.

5. The method according to claim 1, prior to the step of controlling the vehicle-mounted energy storage system to stop charging in a case where the state-of-charge of the vehicle-mounted energy storage system reaches a full charge control state-of-charge, further comprising:
calculating the full charge control state-of-charge according to the feedback ratio.

6. The method according to claim 5, wherein the step of calculating the full charge control state-of-charge according to the feedback ratio comprises:
acquiring a preset number of historical feedback ratios;
calculating an average value of the feedback ratio according to the feedback ratio and the historical feedback ratios; and
calculating the full charge control state-of-charge according to the average value.

7. The method according to claim 1, wherein the method further comprises:
controlling, if the charging mode is the normal charging mode, the vehicle-mounted energy storage system to stop charging in a case where the state-of-charge of the vehicle-mounted energy storage system reaches the fully charged state.

8. A computer device, comprising a memory and a processor, the memory storing a computer program, wherein when the computer program is executed by the processor, the processor is caused to execute following steps:
acquiring first power-condition data and second power-condition data; wherein the first power-condition data is a cumulative number of times that a feedback ratio of a vehicle-mounted energy storage system is greater than a feedback ratio threshold; the second power-condition data is a cumulative number of times that the feedback ratio is less than the feedback ratio threshold; the feedback ratio is a ratio of a target feedback capacity to a rated capacity of the vehicle-mounted energy storage system; and the target feedback capacity is a capacity of regenerative braking energy received during a period when a state-of-charge of the vehicle-mounted energy storage system decreases from a fully charged state to a first preset threshold;
comparing a target difference with a second preset threshold to obtain a comparison result, and determining a charging mode of the vehicle-mounted energy storage system according to the comparison result; wherein the charging mode comprises a normal charging mode and a reserving margin capacity charging mode; and the target difference is a difference between the first power-condition data and the second power-condition data; and
controlling, if the charging mode is the reserving margin capacity charging mode, the vehicle-mounted energy storage system to stop charging in a case where the state-of-charge of the vehicle-mounted energy storage system reaches a full charge control state-of-charge.

9. The computer device according to claim 8, wherein the step of acquiring first power-condition data and second power-condition data comprises:
acquiring pre-stored first historical power-condition data and second historical power-condition data;
performing calculation according to the target feedback capacity to obtain the feedback ratio if the state-of-charge of the vehicle-mounted energy storage system decreases from the fully charged state to the first preset threshold;
determining whether the feedback ratio is greater than or equal to the feedback ratio threshold;
if yes, updating the first historical power-condition data to obtain the first power-condition data, and taking the second historical power-condition data as the second power-condition data; and
if no, updating the second historical power-condition data to obtain the second power-condition data, and taking the first historical power-condition data as the first power-condition data.

10. The computer device according to claim 8, wherein the step of comparing a target difference with a second preset threshold, and determining a charging mode of the vehicle-mounted energy storage system according to the comparison result comprises:
determining whether the target difference is greater than the second preset threshold;
if yes, determining the charging mode of the vehicle-mounted energy storage system as the reserving margin capacity charging mode; and
if no, determining the charging mode of the vehicle-mounted energy storage system as the normal charging mode.

11. The computer device according to claim 8, wherein the step of controlling the vehicle-mounted energy storage system to stop charging in a case where the state-of-charge of the vehicle-mounted energy storage system reaches a full charge control state-of-charge comprises:
querying a lookup table according to the full charge control state-of-charge to obtain a full charge control voltage; and
controlling the vehicle-mounted energy storage system to stop charging if a charging voltage of the vehicle-mounted energy storage system is equal to the full charge control voltage.

12. The computer device according to claim 8, wherein prior to the step of controlling the vehicle-mounted energy storage system to stop charging in a case where the state-of-charge of the vehicle-mounted energy storage system reaches a full charge control state-of-charge, the processor is further configured to execute:

calculating the full charge control state-of-charge according to the feedback ratio.

13. The computer device according to claim 12 wherein the step of calculating the full charge control state-of-charge according to the feedback ratio comprises:

acquiring a preset number of historical feedback ratios;

calculating an average value of the feedback ratio according to the feedback ratio and the historical feedback ratios; and     calculating the full charge control state-of-charge according to the average value.

14. The computer device according to claim 9, wherein when the computer program is executed by the processor, the processor is further configured to execute following steps:

controlling, if the charging mode is the normal charging mode, the vehicle-mounted energy storage system to stop charging in a case where the state-of-charge of the vehicle-mounted energy storage system reaches the fully charged state.

15. A non-transitory computer-readable storage medium, storing a computer program thereon, wherein when the computer program is executed by a processor, steps of the method according to claim 1 are performed.

\* \* \* \* \*